United States Patent
Li et al.

(10) Patent No.: US 6,868,199 B2
(45) Date of Patent: Mar. 15, 2005

(54) FAST TUNABLE WAVELENGTH SELECTIVE OPTICAL SWITCH

(75) Inventors: Xinwan Li, Shanghai (CN); Ailun Ye, Shanghai (CN); Jianping Chen, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 117 days.

(21) Appl. No.: 10/366,064

(22) Filed: Feb. 12, 2003

(65) Prior Publication Data

US 2004/0062473 A1 Apr. 1, 2004

(30) Foreign Application Priority Data

Sep. 29, 2002 (CN) ........................................ 02137254 A

(51) Int. Cl.[7] .............................................. G02B 6/26
(52) U.S. Cl. .............................. 385/21; 385/16; 385/18
(58) Field of Search ............................... 385/21, 14–18, 385/24, 33, 34; 398/48–50, 82, 8; 235/454, 444, 459

(56) References Cited

U.S. PATENT DOCUMENTS

| | | | | |
|---|---|---|---|---|
| 5,619,365 A | * | 4/1997 | Rhoads et al. | 359/248 |
| 5,642,446 A | * | 6/1997 | Tsai | 385/16 |
| 5,974,207 A | * | 10/1999 | Aksyuk et al. | 385/24 |
| 6,005,998 A | * | 12/1999 | Lee | 385/33 |
| 6,097,741 A | * | 8/2000 | Lin et al. | 372/6 |
| 6,320,996 B1 | | 11/2001 | Scobey et al. | 385/18 |
| 6,327,019 B1 | | 12/2001 | Patel et al. | 349/196 |
| 6,449,407 B1 | * | 9/2002 | Kiang et al. | 385/18 |
| 6,747,793 B1 | * | 6/2004 | Flanders | 359/344 |

FOREIGN PATENT DOCUMENTS

WO     WO 01/92951 A1    12/2001    ............ G02F/1/21

OTHER PUBLICATIONS

Smith et al., "Evolution of the Acousto–Optic Wavelength Routing Switch," Journal of Lightwave Technology, vol. 14, No. 6, pp. 1005–1019 (Jun. 1996).

* cited by examiner

Primary Examiner—Michael G. Lee
Assistant Examiner—Kimberly D. Nguyen
(74) Attorney, Agent, or Firm—Synnestvedt & Lechner LLP

(57) ABSTRACT

A fast tunable wavelength selective optical switch is provided to use electro-optic polymer material as the space materials in symmetric Fabry-Perot cavity. In one embodiment, the electro-optic polymer material is an organic-inorganic hybrid material, e.g. alkoxysilane dye ("ASD")/SiO2—TiO2 hybrid materials in particular design. Part of the selected wavelengths will be transmitted through the Fabry-Perot cavity into one output port of the switch, the left wavelengths will be reflected to another output port of the optical switch. Those selected wavelengths could be tuned because the refractive index of such hybrid polymer material could be changed by the external electrical field at the speed of nanosecond level due to the electro-optic effect response.

8 Claims, 6 Drawing Sheets

FAST TUNABLE WAVELENGTH SELECTIVE OPTICAL SWITCH

The present invention generally relates to the field of optical communication technology, and more particularly to two by two optical switches incorporating an electrically tunable filter on a switching element with applications in optical communication systems and networks, such as optical transport networks.

BACKGROUND OF THE INVENTION

Optical fiber is generally preferred as the transmission medium for optical communication networks to satisfy the demand of substantial and fast-growing internet protocol ("IP") data services. Wavelength division multiplexing ("WDM"), which combines many optical signals at different wavelength for transmission in a single optical fiber, is being used to meet the increasing demands for high speed and wide bandwidth in optical transport networks ("OTN") applications. To fully exploit the increased capacity of OTN, a method of routing IP packets is needed so that optical signals arriving at the interconnected node can be transmitted. In order to carry out the plan of IP over WDM, different methods of optical switching take into consideration. The two main kinds of switching are classified: the optical circuit switching and the optical packet switching. Generally speaking, optical circuit switching means that the light from one wavelength or one optical fiber is coupled to another wavelength or another optical fiber. Optical packet switching means that the optical packet data from one time slot on one wavelength in one optical fiber can be transferred to another time slot on the same/or another wavelength in the same/or another optical fiber. Theoretically, the optical packet switching is much better than the optical circuit switching. Optical packet switching can allocate the huge bandwidth of dense wavelength division multiplexing ("DWDM") more actively and more efficiently, but it raises a request for high quality optical devices especially for the optical switches.

Nowadays there is something new to be developed on optical switches. First of all, the dimension size of optical switching matrix should become large enough due to the use of high wavelength density of DWDM technologies and the advanced technology of wide-band optical amplifier; secondly, the ability to select the wavelength of optical switches is also necessary; thirdly, the demand for speed of the switch should be fast from the early level of millisecond ("ms") even to the level of nanosecond ("ns"). There are several types of optical switches available commercially or under research as follows: Micro-Electrical-Mechanical-System ("MEMS"), "Inject BUBBLE", optical liquid-crystal switch and thermal-optic optical switch etc. An approach of MEMS optical switch is to move the mini mirrors mechanically by electrical control. Another approach of Inject BUBBLE optical switch is to switch the light by moving the bubble into the slot via Total Internal Reflection ("TIR"). Optical liquid-crystal switch is to be realized by the use the optical polarization changing. Thermal-optic optical switch is due to the index change by thermal-optic effect. Pity that the majority kinds of optical switches mentioned above has slow switching time. There are further planar waveguide optical switches, e.g. Lithium Niobate ("LiNbO$_3$") or Indium Phosphorous ("InP") planar based switch, which do have the fast switching ability less then 10 nanosecond or faster. However, these switches have no ability of wavelength selection according to publications. Recently, publications and patents about fast tunable wavelength selective optical switches around the world are very few. In the Journal of Lightwave Technology, (Vol. 14, no.6, pp1005,1996 ), David A. Smith, a researcher from Case Western Reserve University, presented a wavelength selective optical switch based on the effect of acoustic-optic. The acoustic-optic tuning scale-factor is 127 KHz/nm about a center frequency of 175 MHz in the 1550 nm-wavelength band. The switching speed of this switch is equal to the acoustic transit time (the given example shows 6 ms). There are three relating patents. The first one is U.S. Pat. No. 6,320,996, called "Wavelength Selective Optical Switch". It is invented by Michael A Scobey of Optical Coating Laboratory in 2001. It chooses a certain wavelength light while reflects all the others by using a mechanical moving thin-film narrow-band wavelength filter. The major disadvantage of this switch is that it takes too long time for the switch to response due to the use of mechanical moving parts inside; also the wavelength of light, which has been chosen, is always fixed. The second one is U.S. Pat. No. 6,327,019, called "Dual liquid-crystal wavelength selective optical switch". It is invented by Jayantilal Patel, W. John Tomlinson, Janet Lehr Jackel, etc., from Tellium Inc and Telcordia Technologies in 2001. It is made up of frequency-dispersive grating, Wollaston prism (used as polarization dispersive element) and liquid-crystal polarized modulation. Since it uses liquid crystal, the stability and responding speed are relatively lower; also the selected-wavelength of the switch is fixed, not tunable. The third patent is WO 0192951, called "Fabry-Perot optical switch". It was invented by Iaconis Christopher, Swaby Basill, Adair Robert W, etc. of Optical Coating Laboratory Inc.(USA) in 2001. It applies a kind of absorbing materials, such as semiconductor, to be inserted into a Fabry-Perot cavity, which was electrically controlled and leads to the two states of transmission and reflection for a particular wavelength. However, the wavelength is also fixed once the cavity is set-up. So, such kind of optical switch has no tuning ability for the selected wavelength.

Thus, it is desirable to provide a kind of optical switch, which has the wavelength selection and further features. For example, the selected wavelength could be tuned fast up to nanosecond level to satisfy the further optical packet switching networks. In a preferred embodiment, the optical switch should have very low loss (e.g. less than 0.5 dB), fast switch speed (e.g. less than 10 ns), and wide wavelength tuning ability (e.g. 10 nanometer or wider).

SUMMARY OF THE INVENTION

The present invention uses fast optical switches adapted with tunable optical filter and methods for manipulating the tunable optical filter to allow multiplexing and de-multiplexing of a number of wavelength channels, named N, in one optical fiber. The optical switch of the present invention can route and switch one or more, saying k number of wavelength channels among the total N number of wavelength channels in one optical fiber with the same time. The selected k wavelengths could be dynamically changed from the N wavelengths by the tunable optical filter. The tunable optical filter of the present invention uses a symmetric Fabry-Perot ("FP") cavity with a spacer materials between reflectors. The cavity resonant frequency could be changed by changing the refractive index of the spacer layers. The spacer material is a kind of electro-optic polymer, as used herein, an organic-inorganic hybrid materials, alkoxysilane dye ("ASD")/SiO2—TiO2 hybrid materials in particular design. The change of the refractive index of such hybrid polymer materials could be changed by the external electrical field at the speed of nanosecond level due to the electro-optic effect response. It is desirable to provide a high electro-optic effect by the use of parallel-plate electrical poling field. Further, the operation wavelength bandwidth is depended on the design of the bandwidth of reflection mirror, which is set between 1500 nanometer ("nm") to 1610 nm together with the consideration of a pair of the optically transparent conductor, such as indium-tin oxide("ITO") and the polarization independence at an angle incident to the mirror normal direction. The package of the FP is also important to improve the reliability and stability for the wavelength tuning of the optical switch. The metal thin film layers should be made on the side face of the substrate for the two usages, one of usage is for the laser welding the FP cavity mirrors on the main quartz base board. Another is for inducing the electrical control signal from the 50 ohms micro-strip lines on the quartz board to the ITO layers inside the FP cavity. Finally, It is very helpful to align the FP cavity in resonant state with the aid of the 632.8 nm He—Ne visual laser light. The antireflection on the back side of the FP cavity mirror in 1550 nm band (1500 nm~1610 nm)and the antireflection on the bottom of the main quartz base board in 1060 nm band are also to be considered for the improvement of the quality of the tunable optical filter and the laser energy coupling efficiency due to the use of YAG laser welding system, respectively.

Additionally, the optical switch of the present invention helps to eliminate or substantially mitigate the use of multiplexing and de-multiplexing of traditional optical switching cross-connect. A detailed description of the present invention is provided with illustrative example related to the operation of the optical switch. By the way, the design of the present invention is not limited to multiplexing and de-multiplexing of WDM signals propagating in only one direction, but also may be used in duplex mode, simultaneously transmitting and receiving in different directions.

The following description is divided into three parts in order to improve the clarity of the description and to assist the reader in understanding the structures involved: optical system, electrical control system and the package system. The optical system includes six components: two pair of collimators and a pair of kernel optical components. The collimator as used herein is the optical device which either focuses parallel light beams essentially to a single mode optical fiber or collects divergent light from a single mode optical fiber to parallel beams. A nominally quarter-pitch gradient refractive index ("GRIN") lenses with a single mode optical fiber is well known in art as such a collimator. Two of the above referred collimators are used as two input ports of the optical switch of the present invention, another two of the collimators are used as two output ports of such optical switch. Both of two kernel optical components should be combined in parallel to construct a FP cavity with the organic-inorganic hybrid materials inside. The combination of the two kernel optical components should be located in the cross point of the two pair of input-output parallel beams. The incident angle from any one input beam to the combination of the two kernel optical components should be exactly same from 10 degree to 45 degree depending on the particular design. First and second input collimators are coupled to the FP cavity. The first output collimator carries those selected wavelength transmitted by the Fabry-Perot cavity from first input collimator and the wavelength reflected by the same cavity from the second input collimator. The second output collimator carries the wavelength transmitted by the Fabry-Perot cavity from the second input collimator and the wavelength reflected by the same cavity from the first input collimator.

Each of the kernel optical components includes six parts. The substrate of the kernel optical component is pure infrared quartz material with the size from 3 mm to 10 mm and the depth from 1.5 mm to 3 mm. The angle of between the two facets of the substrate is permitted (less than 8 degree). Along the normal direction of the facet of the substrate, the kernel optical component is composed of five layers which are: antireflection layer at 1550 nm band, quartz substrate layer, high reflection thin film layer, ITO thin film layer, and the organic-inorganic hybrid polymer material layer. The metal thin film layer is sputtered on the one side face of quartz substrate. The electrical control system provides the electrical signal feeding service, includes one 50 ohm BNC connector, a pair of 50-ohm microstrip lines and an adaptor. The microstrip line is printed on the quartz substrate. One end of the micro strip line is connected with the BNC connector; the other end will be connected by an adaptor avoiding the multiple reflection of the signal along the microstrip line. The two kernel optical components will be attached on the pair of microstrip lines respectively. The last part of the structure is the package system. The main body for packaging is the main quartz baseboard. Beside the printed microstrip line on the top of the main quartz baseboard, there is also a metal layer for installing the two pair of collimators and BNC connector on the top main quartz baseboard. Some additional metal L-flanks will be used for laser welding package. The antireflection on the bottom of the main quartz baseboard in 1060 nm band is also to be considered for the improvement of the laser energy coupling efficiency due to the use of YAG laser welding system.

Generally, the tunable optical filter by the use of electro-optic organic-inorganic hybrid material and FP cavity structure in the present invention is a preferred form of tuning ability to perform a fast tunable wavelength selective optical switch. It is desirable to provide an optical switch that is small size, high speed, and low loss for the efficient application in optical packet switching networks or optical burst switching networks.

DETAILED DESCRIPTION OF THE PREFERRED EMBODIMENTS

Figure 1:
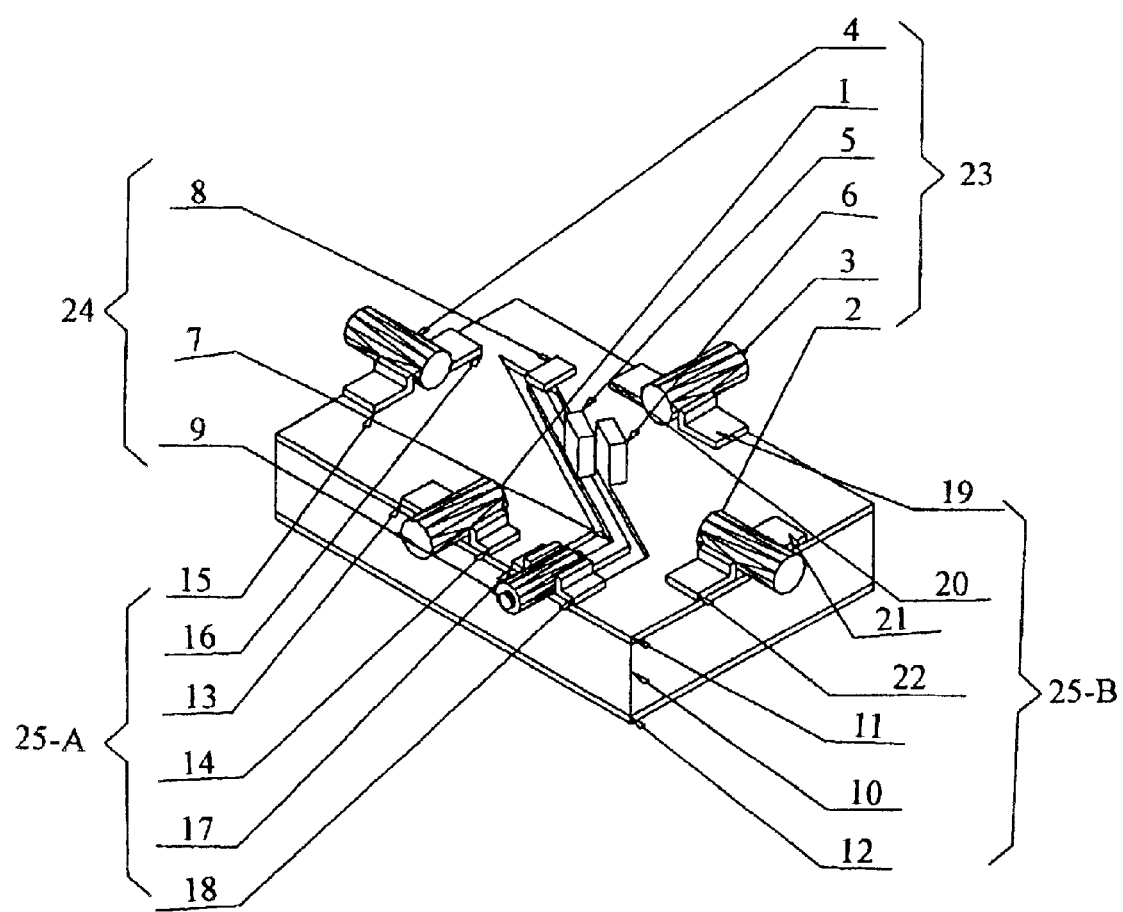
FIG. 1 is a schematic representation of one embodiment of a 2×2 tunable wavelength selective optical switch of the present invention

FIG. 1 is a schematic representation of one embodiment of a 2×2 tunable wavelength selective optical switch of the present invention. The optical switch includes three parts: optical system 23, electrical control system 24 and the package system 25A and 25B. The optical system 23 includes six components: two pair of collimators 1, 2, 3, 4 and a pair of kernel optical components 5, 6. The collimators 1, 2, 3, 4 as used herein are the optical devices which either focus parallel light beam essentially to a single mode optical fiber or collect divergent light from a single mode optical fiber to parallel beam. A nominally quarter-pitch gradient refractive index("GRIN") lenses with a single mode optical fiber is well know in art as such a collimator e.g. 1, 2, 3, or 4. Typically, each collimator 1, 2, 3, or 4 is capable of carrying a plurality of optical wavelength channels. In present invention as in FIG. 1, two of the above referred collimators 1 and 2 are used as two input ports of the optical switch, another two of the collimators 3 and 4 are used as two output ports of such optical switch. Both of two kernel optical components 5 and 6 should be combined in parallel to construct a FP cavity with the organic-inorganic hybrid materials inside. The combination of the two kernel optical components 5 and 6 should be located in the cross point of the two pair of input-output parallel beams. One parallel light beam is from collimator 1 to collimator 3, another parallel light beam is from collimator 2 to collimator 4. The incident angle between the input light beam to the normal of surface of the combination of the two kernel optical components 5 and 6 should be 15 degree depending on the particular design. In the present invention, all of the wavelengths from input collimator 1 will enter the combination of the kernel optical components 5 and 6, then, part of the wavelengths will be transmitted through optical components 5, 6 and toward the output collimator 3, the left wavelengths will reflected back to output collimator 4. With the same way, all of the wavelengths from input collimator 2 will enter the combination of the kernel optical components 5 and 6, then, part of the wavelengths will transmit through optical components 5, 6 and toward the output collimator 4, the left wavelengths will reflected back to output collimator 3.

The electrical control system 24 provides the electrical signal feeding signals, which include one 50 ohm BNC connector 9, a pair of 50-ohm co-planar microstrip lines 7 and an adaptor 8. The co-planar microstrip lines 7 are printed on the quartz substrate 10. The BNC connector 9 is the input port for the external electrical control signal feeding. The BNC connector 9 is connected with one end of the co-planar microstrip lines 7. The adaptor 8 will be connected with another end of the co-planar microstrip lines 7. The adaptor 8 could be used to avoid the multiple reflection of the external control signal along the mirostrip lines 7. The two kernel optical components 5, 6 will be attached on the pair of microstrip lines 7 respectively.

The last part of the structure is the package system 25A and 25B. The main body of package system is the main quartz baseboard 10. Beside the printed microstrip line 7 on the top of the main quartz baseboard 10, there is also a metal layer 11 on the top of the main quartz baseboard. The metal layer 11 could also be used for installing the two pair of collimators 1, 2, 3, 4 and BNC connector 9. Particularly, this metal layer 11 is also the ground for the external control signals. There is a dielectric thin film layer 12 on the bottom face of the main quartz baseboard 10. The dielectric thin film layer 12 is a kind of antireflection film in 1060 nm band due to the improvement of the laser energy coupling efficiency via the use of YAG laser welding system. Some additional metal L-flanks 13, 14, 15, 16, 19, 20, 21, 22, 17 and 18 will be used for fixing the collimators 1, 4, 3, 2 and BNC connector 9 respectively during laser welding. L-flanks 13, 14 are for fixing collimator 1 to the quartz baseboard 10 via metal layer 11. L-flanks 15, 16 are for fixing collimator 4 to the quartz baseboard 10 via metal layer 11. L-flanks 17, 18 are for fixing BNC connector 9 to the quartz baseboard 10 via metal layer 11. L-flanks 19, 20 are for fixing collimator 3 to the quartz baseboard 10 via metal layer 11. L-flanks 21, 22 are for fixing collimator 2 to the quartz baseboard 10 via metal layer 11.

Figure 2:
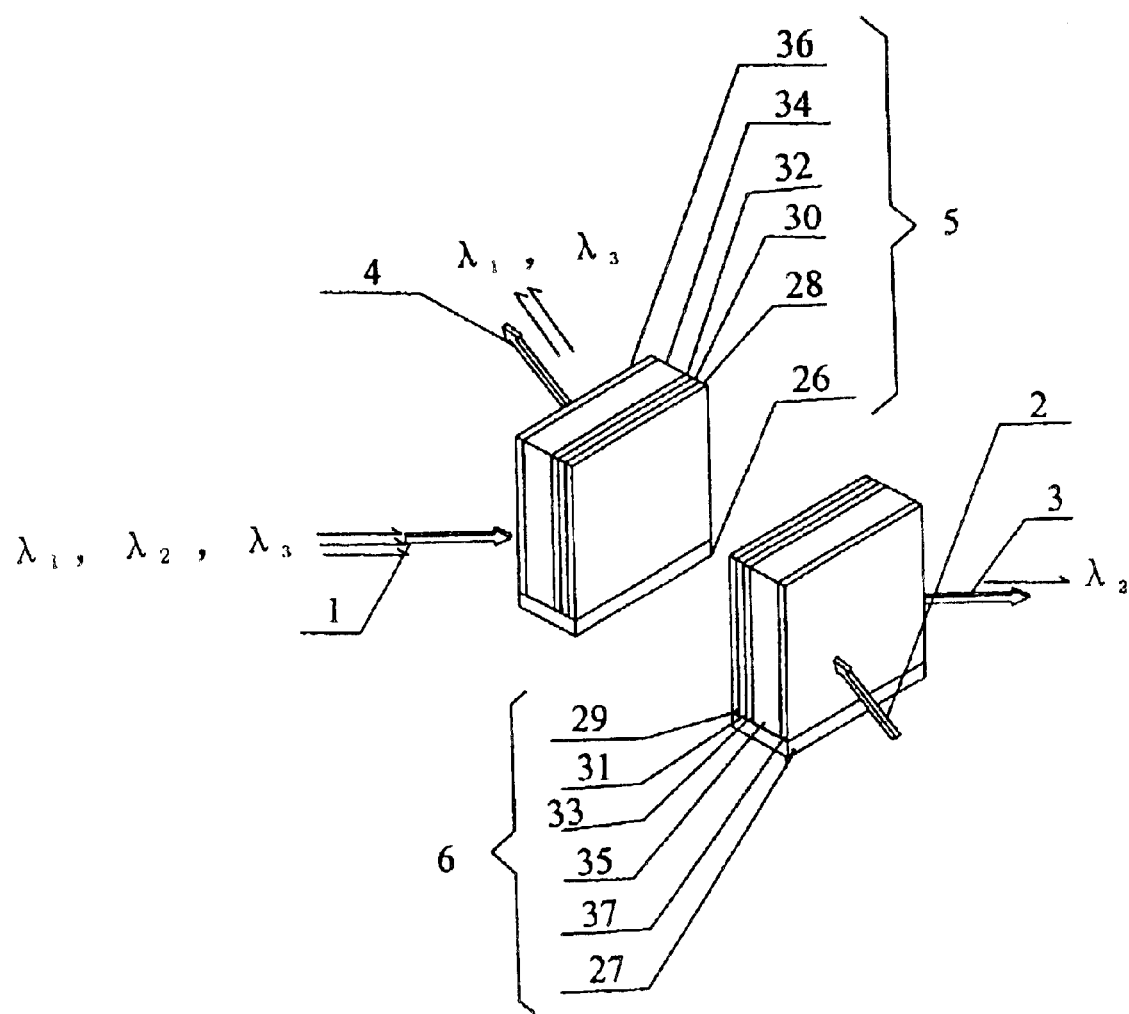
FIG. 2 is a schematic representation of the kernel optical components of the Fabry-Perot cavity of optical switch in FIG. 1.

FIG. 2 is a schematic representation of the kernel optical components of the Fabry-Perot cavity of optical switch in FIG. 1. The two same kernel optical components 5 and 6 should be aligned in parallel face to face as shown in FIG. 2. The kernel optical component 5 includes six parts: substrate 34 and five thin film sections 36, 32, 30, 28 and 26. The substrate 34 of the kernel optical component 5 is pure infrared quartz materials with the size of 4 mm by 4 mm and with the depth of 2 mm. The angle between the two faces of the substrate 34 is permitted (less than 8 degree). Along the normal direction of the face of the substrate 34, the kernel optical component 5 is composed of five sections, which are: antireflection section 36, quartz substrate section 34, high reflection dielectric mirror section 32, indium transparent oxide section 30 and electro-optic polymer section 28. The antireflection section 36 is an antireflection dielectric thin film layer at 1550 nm band in the order of $(LH)^n$, where H and L are sublayer for high and lower refractive indices of the dielectric materials, n is the number of stacks. Each sublayer H, or L has an optical thickness of one quarter center wavelength. Normally, the reflection of antireflection section 36 should be low enough about 0.02% with several sublayers inside. The high reflection dielectric mirror section 32 is a high reflective dielectric thin film layer at 1550 nm band in the order of $(HL)^m$, m is the number of stacks. The m number of high reflection dielectric mirror section 32 is about eight to ten. The reflection of high reflection dielectric mirror section 32 should be high up to 99%. The indium transparent oxide section 30 is a metal thin film layer with about 20 nanometer depth. The electro-optic ("EO") polymer section 28 is an organic-inorganic hybrid polymer material layer, as used herein, alkoxysilane dye ("ASD")/ SiO2—TiO2 hybrid materials in particular design. The EO polymer section 28 has been prepared by sol-gel process, and spin-coated on the surface of indium transparent oxide section 30. After parallel electrical poling field at temperature of 180° C. for one hour, this polymer shows the good electro-optic efficient. On the bottom of the kernel optical component 5, there is a metal thin film section 26 with 200-nanometer depth. The kernel optical component 6 includes six sections: antireflection section 37, quartz substrate section 35, high reflection dielectric mirror section 33, indium transparent oxide section 31 and electro-optic polymer section 29 and metal thin film section 27. Both of two kernel optical components 5 and 6 will be attached on the co-planar microstrip lines via metal thin film section 26 and 27, respectively.

Up to this point, It is easy to be seen that there is a distance between the two kernel optical components 5 and 6 in FIG. 1 and FIG. 2. The choose of air space distance is depended on the design of the tunable wavelength selective optical switch. For one simplified embodiment of the present invention, it can be designed as one from N tunable wavelength selective optical switch with the air space distance of about 80 micrometer except the depth of the EO polymer films. At this particular design, the free spectrum range ("FSR") of the FP cavity should be large enough in the operation wavelength band. However, space distance could be changed from 10 $\mu$m to 1500 $\mu$m.

The operation principle of the tunable wavelength selective optical switch can be explained in FIG. 2. The optical switch changes from one state to another by changing the refractive index of the EO polymer materials in response to the external control signal. In one state, only those wavelengths where the two reflectors interfere to cancel out the reflection at the front surface can be transmitted through the FP cavity. We call those wavelengths as selected wavelengths by the optical switch. Other wavelengths except those selected by FP cavity will be reflected back. Given a external control field, the refractive index of the EO polymer will be changed, then, those selected wavelengths will be changed or tuning by the control field. It is further understood that the properties of the EO polymer materials chosen determine the characteristics of the optical switch. As shown in FIG. 2, first and second input collimators 1, 2 are coupled to the FP cavity. The first output collimator 4 carries those selected wavelength transmitted by the Fabry-Perot cavity from first input collimator 1 and the wavelength reflected by the same cavity from the second input collimator 2. The second output collimator 3 carries the wavelength transmitted by the Fabry-Perot cavity from the second input collimator 2 and the wavelength reflected by the same cavity from the first input collimator 1. Three wavelengths ($\lambda_1, \lambda_2, \lambda_3$) carried in input collimator 1 enter the two kernel optical components 5, 6, only one wavelength ($\lambda_2$) can be transmitted through it and enter the output collimator 3 due to the wavelength selection of FP cavity. The other two wavelengths($\lambda_1, \lambda_3$) will be reflected back to the output collimator 4. It is easy to understand for the signals to transmit and reflect some selected wavelength from input port 2 to output port 3 and 4.

Figure 3:
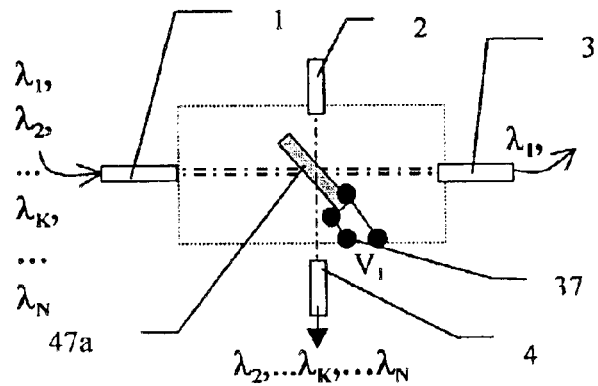
FIG. 3 is the simplified layout of the fast tunable one of N ("1λ/N") wavelength selective optical switch in the first state (wavelength $\lambda_1$ selected).

FIG. 3 is the simplified layout of the fast tunable one of N("$1\lambda$/N") wavelength selective optical switch in the first state (wavelength $\lambda_1$ selected). N wavelengths ($\lambda_1, \lambda_2, \lambda_3, \ldots \lambda_K, \ldots \lambda_N$) carried in the input collimator 1 enter the FP cavity 47a, only one wavelength ($\lambda_1$) will be selected and transmitted to the output collimator 3, other wavelengths($\lambda_2, \lambda_3, \ldots \lambda_K, \ldots \lambda_N$) will be reflected to output collimator 4. During this state, the external electrical control voltage 37 ($V_1$) is applied. The voltage $V_1$ related the selected wavelength ($\lambda_1$) of FP cavity 47a.

Figure 4:
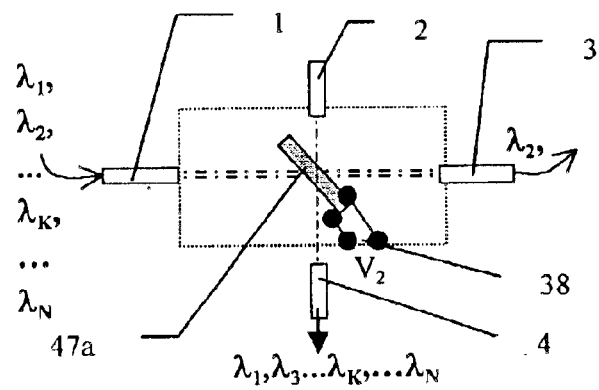
FIG. 4 is the simplified layout of the fast tunable one of N ("1λ/N") wavelength selective optical switch in the second state (wavelength $\lambda_2$ selected).

FIG. 4 is the simplified layout of the fast tunable one of N("$1\lambda$/N") wavelength selective optical switch in the second state (wavelength $\lambda_2$ selected). N wavelengths ($\lambda_1, \lambda_2, \lambda_3, \ldots \lambda_K, \ldots \lambda_N$) carried in the input collimator 1 enter the FP cavity 47a, only one wavelength ($\lambda_2$) will be selected and transmitted to the output collimator 3, other wavelengths($\lambda_1, \lambda_3, \ldots \lambda_K, \ldots \lambda_N$) will be reflected to output collimator 4. During this state, the external electrical control voltage 38 ($V_2$) is applied. The voltage $V_2$ related the selected wavelength ($\lambda_2$) of FP cavity 47a.

Figure 5:
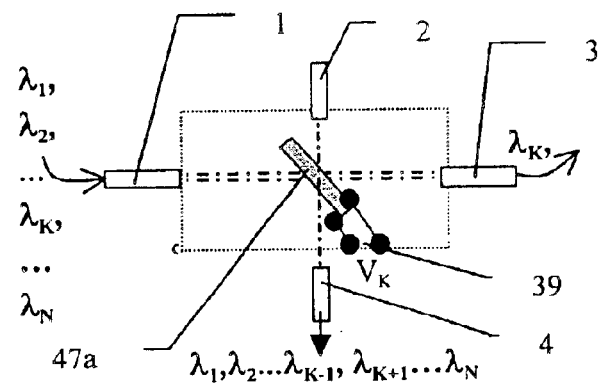
FIG. 5 is the simplified layout of the fast tunable one of N ("1λ/N") wavelength selective optical switch in the $K^{th}$ state (wavelength $\lambda_K$ selected).

FIG. 5 is the simplified layout of the fast tunable one of N("$1\lambda$/N") wavelength selective optical switch in the $K^{th}$ state (wavelength $\lambda_K$ selected). N wavelengths ($\lambda_1, \lambda_2, \lambda_3, \ldots \lambda_K, \ldots \lambda_N$) carried in the input collimator 1 enter the FP cavity 47a, only one wavelength ($\lambda_K$) will be selected and transmitted to the output collimator 3, other wavelengths($\lambda_1, \lambda_2, \ldots \lambda_{K-1}, \lambda_{K+1} \ldots \lambda_N$) will be reflected to output collimator 4. During this state, the external electrical control voltage 39 ($V_K$) is applied. The voltage $V_K$ related the selected wavelength ($\lambda_K$) of FP cavity 47a.

Figure 6:
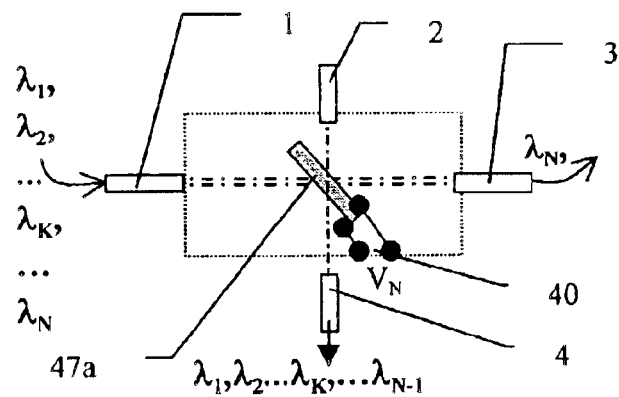
FIG. 6 is the simplified layout of the fast tunable one of N ("1λ/N") wavelength selective optical switch in the $N^{th}$ state (wavelength $\lambda_N$ selected).

FIG. 6 is the simplified layout of the fast tunable one of N("$1\lambda$/N") wavelength selective optical switch in the $N^{th}$ state (wavelength $\lambda_N$ selected). N wavelengths ($\lambda_1, \lambda_2, \lambda_3, \ldots \lambda_K, \ldots \lambda_N$) carried in the input collimator 1 enter the FP cavity 47a, only one wavelength ($\lambda_N$) will be selected and transmitted to the output collimator 3, other wavelengths($\lambda_1, \lambda_2, \ldots \lambda_K, \ldots \lambda_{N-1}$) will be reflected to output collimator 4. During this state, the external electrical control voltage 40 ($V_N$) is applied. The voltage $V_N$ related the selected wavelength ($\lambda_N$) of FP cavity 47a.

Figure 7:
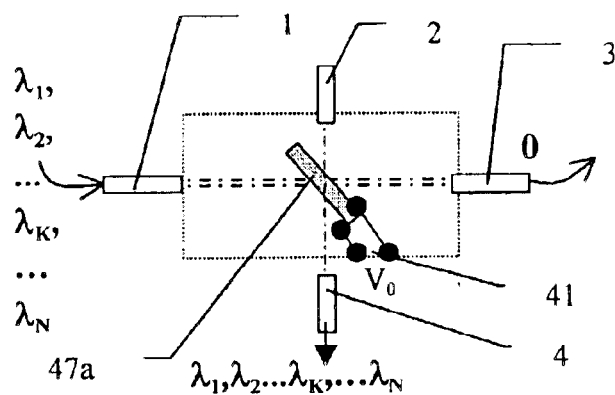
FIG. 7 is the simplified layout of the fast tunable one of N ("1λ/N") wavelength selective optical switch in the $(N+1)^{th}$ state (no wavelength selected).

FIG. 7 is the simplified layout of the fast tunable one of N("$1\lambda$/N") wavelength selective optical switch in the $(N+1)^{th}$ state (no wavelength selected). N wavelengths ($\lambda_1, \lambda_2, \lambda_3, \ldots \lambda_K, \ldots \lambda_N$) carried in the input collimator 1 enter the FP cavity 47a, no one wavelength will be selected and transmitted to the output collimator 3, all wavelengths($\lambda_1, \lambda_2, \ldots \lambda_K, \ldots \lambda_N$) will be reflected to output collimator 4. During this state, the external electrical control voltage 41 ($V_0$) is applied. The voltage $V_0$ related the none selected wavelength of FP cavity 47a.

Figure 8:
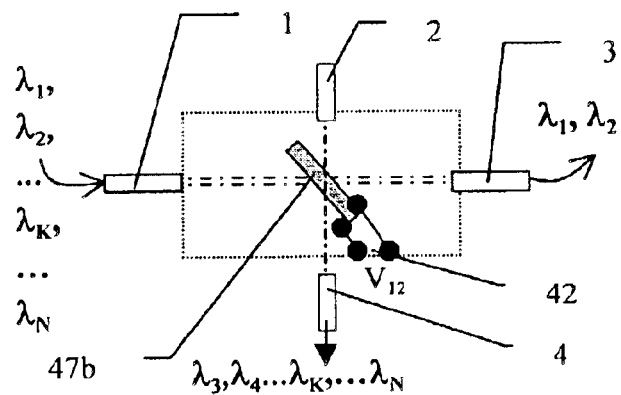
FIG. 8 is the simplified layout of the fast tunable two of N ("2λ/N") wavelength selective optical switch in the first state (wavelength $\lambda_1$, $\lambda_2$ selected).

FIG. 8 is the simplified layout of the fast tunable two of N("$2\lambda$/N") wavelength selective optical switch in the first state (wavelength $\lambda_1, \lambda_2$ selected). N wavelengths ($\lambda_1, \lambda_2, \lambda_3, \ldots \lambda_K, \ldots \lambda_N$) carried in the input collimator 1 enter the tunable filter 47b, only two wavelengths ($\lambda_1, \lambda_2$) will be selected and transmitted to the output collimator 3, other wavelengths($\lambda_3, \lambda_4, \ldots \lambda_K, \ldots \lambda_N$) will be reflected to output collimator 4. During this state, the external electrical control voltage 42 ($V_{12}$) is applied. The voltage $V_{12}$ related the selected wavelength ($\lambda_1, \lambda_2$) of the tunable components 47b.

Figure 9:
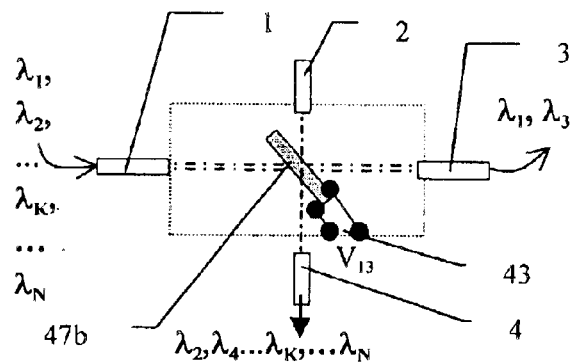
FIG. 9 is the simplified layout of the fast tunable two of N ("2λ/N") wavelength selective optical switch in the second state (wavelength $\lambda_1$, $\lambda_3$ selected).

FIG. 9 is the simplified layout of the fast tunable two of N("$2\lambda$/N") wavelength selective optical switch in the second state (wavelength $\lambda_1, \lambda_3$ selected). N wavelengths ($\lambda_1, \lambda_2, \lambda_3, \ldots \lambda_K, \ldots \lambda_N$) carried in the input collimator 1 enter the tunable filter 47b, only two wavelengths ($\lambda_1, \lambda_3$) will be selected and transmitted to the output collimator 3, other wavelengths($\lambda_2, \lambda_4, \ldots \lambda_K, \ldots \lambda_N$) will be reflected to output collimator 4. During this state, the external electrical control voltage 43 ($V_{13}$) is applied. The voltage $V_{13}$ related the selected wavelength ($\lambda_1, \lambda_3$) of the tunable components 47b.

Figure 10:
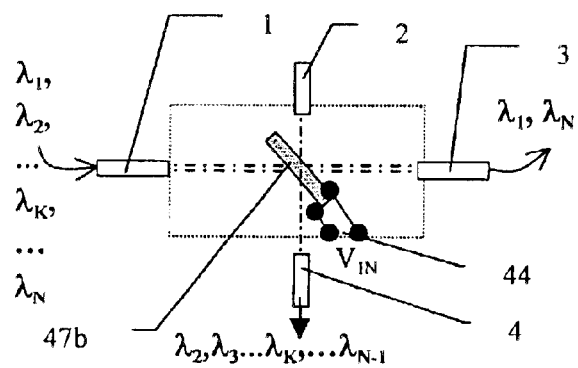
FIG. 10 is the simplified layout of the fast tunable two of N ("2λ/N") wavelength selective optical switch in the $(N-1)^{th}$ state (wavelength $\lambda_1$, $\lambda_N$ selected).

FIG. 10 is the simplified layout of the fast tunable two of N("$2\lambda$/N") wavelength selective optical switch in the $(N-1)^{th}$ state (wavelength $\lambda_1, \lambda_N$ selected). N wavelengths ($\lambda_1, \lambda_2, \lambda_3, \ldots \lambda_K, \ldots \lambda_N$) carried in the input collimator 1 enter the tunable filter 47b, only two wavelengths $(\lambda_1,\lambda_N)$ will be selected and transmitted to the output collimator 3, other wavelengths $(\lambda_2,\lambda_3, \ldots \lambda_K, \ldots \lambda_{N-1})$ will be reflected to output collimator 4. During this state, the external electrical control voltage 44 ($V_{1N}$) is applied. The voltage $V_{1N}$ related the selected wavelength $(\lambda_1,\lambda_N)$ of the tunable components 47b.

Figure 11:
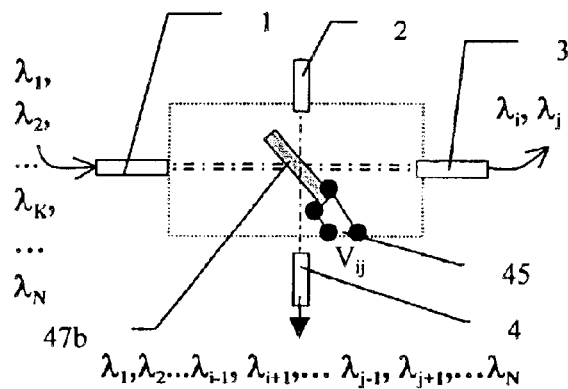
FIG. 11 is the simplified layout of the fast tunable two of N ("2λ/N") wavelength selective optical switch in the $K^{th}$ state (wavelength $\lambda_i$, $\lambda_j$ selected).

FIG. 11 is the simplified layout of the fast tunable two of N("$2\lambda$/N") wavelength selective optical switch in the $K^{th}$ state (wavelength $\lambda_i$, $\lambda_j$ selected). N wavelengths $(\lambda_1,\lambda_2,\lambda_3, \ldots \lambda_K, \ldots \lambda_N)$ carried in the input collimator 1 enter the tunable filter 47b, only two wavelengths $(\lambda_i,\lambda_j)$ will be selected and transmitted to the output collimator 3, other wavelengths $(\lambda_1,\lambda_2, \ldots \lambda_{i-1},\lambda_{i+1}, \ldots \lambda_{j-1},\lambda_{j+1}, \ldots \lambda_N)$ will be reflected to output collimator 4. During this state, the external electrical control voltage 45 ($V_{ij}$) is applied. The voltage $V_{ij}$ related the selected wavelength $(\lambda_i,\lambda_j)$ of the tunable components 47b.

Figure 12:
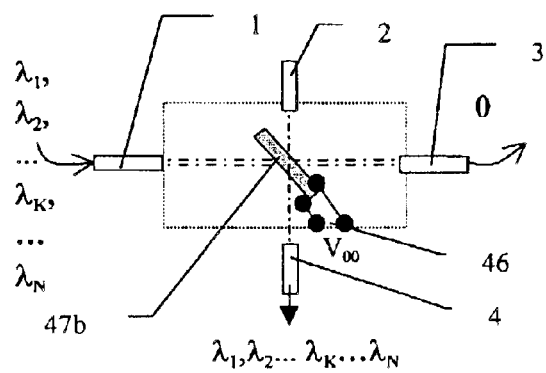
FIG. 12 is the simplified layout of the fast tunable two of N ("2λ/N") wavelength selective optical switch in the $(C_N^2 + 1)^{th}$ state (no wavelength selected).

FIG. 12 is the simplified layout of the fast tunable two of N("$2\lambda$/N") wavelength selective optical switch in the $(C_N^2+1)^{th}$ state (no wavelength selected). N wavelengths $(\lambda_1,\lambda_2,\lambda_3, \ldots \lambda_K, \ldots \lambda_N)$ carried in the input collimator 1 enter the tunable filter 47b, no wavelengths will be selected and transmitted to the output collimator 3, all wavelengths $(\lambda_1,\lambda_2, \ldots \lambda_K, \ldots \lambda_N)$ will be reflected to output collimator 4. During this state, the external electrical control voltage 46 ($V_{OO}$) is applied. The voltage $V_{OO}$ related the none selected wavelength of the tunable components 47b.

Figure 13:
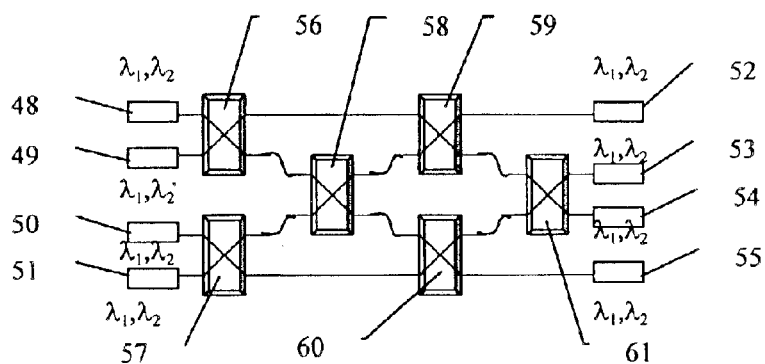
FIG. 13 is the simplified switching node with the application of fast tunable wavelength selective 2×2 optical switch.

FIG. 13 is the simplified switching node with the application of fast tunable wavelength selective 2×2 optical switch. The switching node has four optical fiber input ports 48, 49, 50, 51 and four optical fiber output port 52, 53, 54, 55. In each optical fiber, there are two wavelengths $(\lambda_1,\lambda_2)$ in it. There are at least six fast tunable wavelength selective 2×2 optical switch 56, 57, 58, 59, 60, 61 inside. The links between 2×2 optical switch are shown in FIG. 13. One output fiber of optical switch 56 will be connected with the input fiber of optical switch 59. Another output fiber of optical switch 56 will be connected with the input fiber of optical switch 58. The other links are similar to that of shown in FIG. 13. This is a equivalent optical switching node of 8 by 8 switching size. Each 2×2 optical switch unit 56, 57, 58, 59, 60, or 61 will be controlled synchronously in wavelength.

Figure 14:
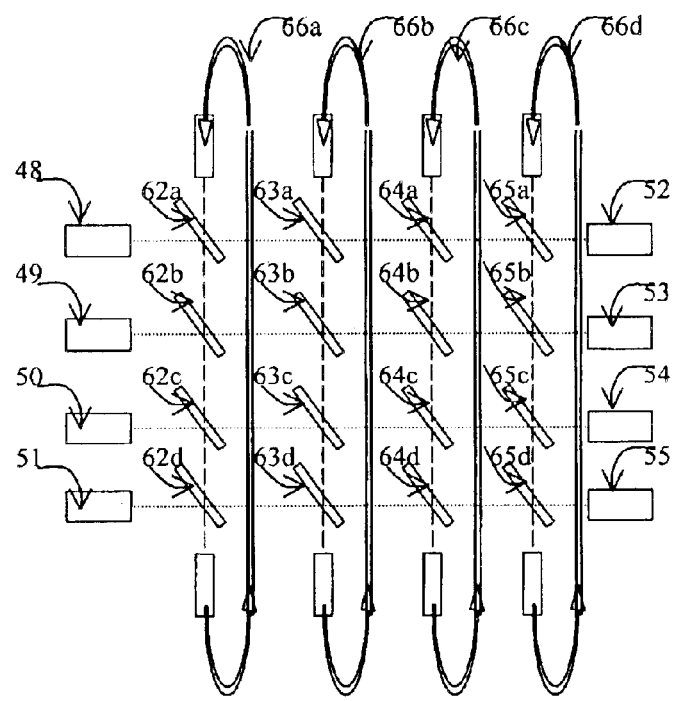
FIG. 14 is the wavelength non-blocking switching node with the application optical tuning components in fast tunable wavelength selective 2×2 optical switch.

FIG. 14 is the wavelength non-blocking switching node with the application optical tuning components in fast tunable wavelength selective 2×2 optical switch. The switching node has four optical fiber input ports 48, 49, 50, 51 and four optical fiber output port 52, 53, 54, 55. In each optical fiber, there are four wavelengths $(\lambda_1,\lambda_2,\lambda_3,\lambda_4)$ in it. There are at least sixteen optical tuning components used in fast tunable wavelength selective 2×2 optical switch, 62a, 62b, 62c, 62d, 63a, 63b, 63c, 63d, 64a, 64b, 64c, 64d, 65a, 65b, 65c, 65d inside. The links are explained as follows. The all links can be classified as four horizontal links and four vertical ring links. One link of the four horizontal links is from input 48 to 62a to 63a to 64a to 65a to output 52, The other links are same as shown in FIG. 14. One link of the four vertical links is from 62a to 62b to 62c to 62d to 62a, The link from 62d to 62a is the optical fiber 66a. The other links are same as shown in FIG. 14. 66b, 66c, 66d are optical fiber links similarly to 66a. There are four stages of the links due to the consideration of four wavelength in each optical fiber. This is a equivalent optical switching node of 16 by 16 switching size. If there are five wavelengths in each fiber, the number of stages should be different. Each optical tuning components 62a, 62b, 62c, 62d, 63a, 63b, 63c, 63d, 64a, 64b, 64c, 64d, 65a, 65b, 65c, 65d will be controlled synchronously in wavelength.

EMBODIMENTS

EXAMPLE 1

1$\lambda$/N Wavelength Selective 2×2 Optical Switch

The fast tunable wavelength selective 2×2 optical switch was constructed using kernel optical components 5, 6 shown in FIG. 1. The main parameters of the kernel optical components 5, 6 are as follows: The high reflective dielectric thin film layer at 1550 nm band was deposited on the pure quartz plate in the order of $(HL)^m$.m=8. The reflection of high reflection dielectric mirror was designed at 95%. The indium transparent oxide was sputtered on the high reflection mirror with depth of 20 nm. The electro-optic ("EO") polymer, alkoxysilane dye ("ASD")/SiO2—TiO2 hybrid materials, was prepared by sol-gel process, and spin-coated with about 4 micrometer depth on the surface of indium transparent oxide. After parallel electrical poling field of 1V per micrometer at temperature of 180° C. for one hour, the electro-optic efficient of this polymer is about 5 pm/V under the poling field. The spacing distance between the two kernel optical components 5, 6 are about 60 micrometer. The test results are shown in table 1.

TABLE 1

| Parameters under test | maximum | Condition of test |
|---|---|---|
| Operation wavelength | 1530 nm~1560 nm | Due to the FSR limitation |
| Insertion loss | 3.2 dB | For all wavelengths |
| Switching time | Less than 10 ns | Limited by the control voltage circuits |
| HWFW | 1.5 nm | |
| Wavelength tuning range | 4.5 nm | Control voltage 100 V |
| Wavelength channels with in one optical fiber | 2 | Wavelength spacing 3 nm |

EXAMPLE 2

1$\lambda$/N Wavelength Selective 2×2 Optical Switch

The main parameters of the kernel optical components 5, 6 are as follows: The high reflective dielectric thin film layer at 1550 nm band was deposited on the pure quartz plate in the order of $(HL)^n$ n=11. The reflection of high reflection dielectric mirror was designed at 98%. The indium transparent oxide was sputtered on the high reflection mirror with depth of 20 nm. The electro-optic("EO") polymer, alkoxysilane dye ("ASD")/SiO2—TiO2 hybrid materials, was prepared by sol-gel process, and spin-coated on the surface of indium transparent oxide with about 5 micrometer depth. After parallel electrical poling field of 4V per micrometer at temperature of 180° C. for one hour, the electro-optic efficient of this polymer is about 40 pm/V under the poling field. The spacing distance between the two kernel optical components 5, 6 are about 20 micrometer. The test results are shown in table 2.

TABLE 2

| Parameters under test | maximum | Condition of test |
|---|---|---|
| Operation wavelength | 1530 nm~1560 nm | Due to the FSR limitation |
| Insertion loss | 2.2 dB | For all wavelengths |
| Switching time | Less than 10 ns | Limited by the control voltage circuits |

TABLE 2-continued

| Parameters under test | maximum | Condition of test |
|---|---|---|
| HWFW | 0.3 nm | |
| Wavelength tuning range | 7.5 nm | Control voltage 100 V |
| Wavelength channels with in one optical fiber | 8 | Wavelength spacing 0.8 nm |

In general, the novel embodiments of present invention have numerous advantages over existing optical switches. Multiple functions, such as wavelength multiplexing and de-multiplexing and space switching, have been integrated in one embodiment design structure. Those thin film techniques used in present invention are compatible from the point of realization ability, including the dielectric multi-layer thin film, transparent conductor thin film, and especially, the EO polymer film. Although the above discussion addressed the use of fast tunable wavelength selective 2×2 optical switch, the inventive optical switch and its use is not limited, It allows a more complex optical switching with the number of wavelength selection and the number of input or output ports.

What is claimed is:

1. An optical switch comprises:
    an optical system having
    first and second input collimators coupled to at an angle from 10 degree to 45 degree
    a Fabry-Perot structure having at least one thin film layer of electro-optical polymer materials in a cavity, and
    first output collimator carrying those selected wavelength transmitted by the Fabry-Perot cavity from first input collimator and the wavelength reflected by the same cavity from the second input collimator, and
    second output collimator carrying the wavelength transmitted by the Fabry-Perot cavity from second input collimator and the wavelength reflected by the same cavity from the first input collimator;
    an electrical control system providing the electrical tuning signal feeding service;
    a package system having:
    a main quartz baseboard with a metal layer on its surface for installing all optical and electrical components.

2. The optical switch according to claim 1 wherein two input collimators and two output collimators of the optical system individually carry N wavelengths in each.

3. The optical switch according to claim 1 wherein the Fabry-Perot structure is a fast tunable Fabry-Perot cavity, each of two kernel optical components having:
    an antireflection layer in 1500 nm to 1610 nm band, and
    a high pure quartz substrate, and
    a high reflector with reflection 95%, and
    a layer of transparent conductor to provide the electrical control signal feeding, and
    a layer of electro-optic polymer materials to provide the refractive index change under the external control electrical field, and
    a metal thin film layer on the side of the quartz substrate.

4. The optical switch of claim 3 wherein the antireflection layers and the high reflectors comprise a dielectric stacks, in the order of $(HL)n$, wherein H and L are high and lower refractive indices of the dielectric materials at length of quarter of operation wavelength, n is the number of stacks.

5. The optical switch according to claim 3 wherein the transparent conductors comprise the indium tin oxide, which is electrically attached with the coplanar microstrip lines on the main quartz base board via the metal thin film layer.

6. The optical switch according to claim 1 wherein the electrical control system provides the electrical tuning signal feeding service, which include:
    a Bayonet Neill Concelman connector for the input port of the control signal feeding, and
    a pair of coplanar microstrip lines for transmitting the control signal, and
    an adaptor avoiding the multiple reflection of the signal along the mirostrip line.

7. The optical switch according to claim 1 wherein the metal layer on the surface of the main quartz base board is for fixing the two pair of collimators, Bayonet Neill Concelman connector and two kernel optical components of Fabry-Perot cavity by the Yttrium Aluminum Garnet laser welding package.

8. The optical switch according to claim 1 wherein all the electrical and optical components are packaged by Yttrium Aluminum Garnet laser welding.

* * * * *